US006831674B2

(12) United States Patent
Hirawa

(10) Patent No.: US 6,831,674 B2
(45) Date of Patent: Dec. 14, 2004

(54) IMAGE RECORDING APPARATUS AND IMAGE RECORDING METHOD USING DIFFRACTION GRATING TYPE LIGHT MODULATOR

(75) Inventor: Takahide Hirawa, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 76 days.

(21) Appl. No.: 10/366,358

(22) Filed: Feb. 14, 2003

(65) Prior Publication Data

US 2003/0179280 A1 Sep. 25, 2003

(30) Foreign Application Priority Data

Mar. 19, 2002 (JP) ....................................... 2002-075578

(51) Int. Cl.[7] ............................ B41J 2/465; B41J 2/47; G02F 1/21; G02B 26/00; G02B 26/02

(52) U.S. Cl. ....................................... 347/239; 347/255

(58) Field of Search ................................. 347/239, 255; 359/237, 290–292, 566, 568, 572

(56) References Cited

U.S. PATENT DOCUMENTS 5,841,579 A 11/1998 Bloom et al.
6,038,057 A 3/2000 Brazas, Jr. et al.
6,381,062 B1 * 4/2002 Kowarz et al. ............. 359/291
2002/0028079 A1 3/2002 Kataoka

FOREIGN PATENT DOCUMENTS

EP 1 010 995 6/2000
EP 1 107 024 6/2001

* cited by examiner

*Primary Examiner*—Huan Tran
(74) *Attorney, Agent, or Firm*—McDermott Will & Emery LLP

(57) ABSTRACT

In an image recording apparatus for recording an image by guiding zeroth order diffracted light beams from a plurality of diffraction grating type light modulator elements as signal beams to a recording medium, a transition of each of light modulator elements from an OFF state to an ON state is detected and when this transition is detected, the light modulator element is temporarily supplied with an auxiliary driving voltage (V3) between a driving voltage (V1) for bringing the light modulator element into the ON state and a driving voltage (V2) for bringing the light modulator element into the OFF state. This suppresses an overshoot due to a sharp change of the light modulator element to the ON state and achieves beam writing with appropriate line space ratio.

7 Claims, 15 Drawing Sheets

F/G. 1

IMAGE RECORDING APPARATUS AND IMAGE RECORDING METHOD USING DIFFRACTION GRATING TYPE LIGHT MODULATOR

BACKGROUND OF THE INVENTION

1. Field of the Invention

The present invention relates to an image recording apparatus using a plurality of diffraction grating type light modulator elements for recording an image on a recording medium.

2. Description of the Background Art

Developed has been a diffraction grating type light modulator element which is capable of changing the depth of grating by alternately forming fixed ribbons and moving ribbons on a substrate with a semiconductor device manufacturing technique and sagging the moving ribbons relatively to the fixed ribbons. It is proposed that such a diffraction grating as above, in which the intensities of a normally reflected light beam and diffracted light beams are changed by changing the depth of grating, should be used for an image recording apparatus in techniques such as CTP (Computer to Plate) as a switching element of light.

For example, a plurality of diffraction grating type light modulator elements provided in the image recording apparatus are irradiated with light, and then reflected light beams (zeroth order diffracted light beams) from light modulator elements in a state where the fixed ribbons and the moving ribbons are positioned at the same height from a base surface are guided to the recording medium and non-zeroth order diffracted light beams (mainly first order diffracted light beams) from light modulator elements in a state where the moving ribbons are sagged are blocked, to achieve an image recording on the recording medium.

In such a diffraction grating type light modulator element, however, since the driving voltage supplied for the moving ribbons and the amount of sag of the moving ribbons are not in proportion to each other, even if a curve indicating a change in driving voltage at the time when the light modulator element is changed from an ON state (a state where a signal beam is guided from the light modulator element to the recording medium) to an OFF state (a state where no light is guided from the light modulator element to the recording medium) is made equivalent (symmetrical) to a curve indicating a change in driving voltage at the time when the light modulator element is changed from the OFF state to the ON state, changes in intensity of light outputted from the light modulator element in both the cases do not become equivalent (symmetrical) to each other.

Specifically, when the light modulator element is changed from a state where the change in sag of the moving ribbons is large with respect to the change in driving voltage to a state where the change in sag is small, it is hard for the moving ribbons to follow the driving voltage since a large initial acceleration is given to the moving ribbons and this results in excessively quick moving of the moving ribbons and oscillation thereof. As a result, even if the light modulator elements are changed periodically between the ON state and the OFF state, it is hard to write appropriate dots on the recording medium which travels at constant speed relatively to the light modulator elements.

SUMMARY OF THE INVENTION

The present invention is intended for an image recording apparatus for recording an image on a recording medium by exposure, and it is an object of the present invention to achieve an appropriate image recording in consideration of the characteristics of a diffraction grating type light modulator element.

According to an aspect of the present invention, the image recording apparatus comprises a light modulator having a plurality of diffraction grating type light modulator elements with fixed ribbons and moving ribbons alternately arranged, a light source for emitting a light with which the light modulator is irradiated, a holding part for holding a recording medium on which an image is recorded with zeroth order diffracted light beams from some of the light modulator elements in which the moving ribbons do not sag, a transfer mechanism for transferring the holding part relatively to the light modulator, a detection circuit for detecting whether or not there is a transition of each of the plurality of light modulator elements from a state of emitting first order diffracted light beams to a state of emitting a zeroth order diffracted light beam, and a control circuit for temporarily supplying each of the light modulator elements on which the transition is detected with an auxiliary driving voltage between a driving voltage on emission of first order diffracted light beams and a driving voltage on emission of a zeroth order diffracted light beam.

The image recording apparatus of the present invention can suppress an overshoot of the moving ribbons and consequently achieve an appropriate image recording.

More generally, the detection circuit detects whether or not there is a transition of each of the plurality of light modulator elements from a state where the amount of sag of the moving reflection surfaces is large with respect to a change in driving voltage to a state where the amount is small.

The present invention is further developed into a technique to detect a state transition of each of the plurality of light modulator elements at a series of points in time and supply each of the light modulator elements with a driving voltage in accordance with the state transition at the series of points in time This achieves a flexible control of the driving voltage.

The present invention is also intended for a method of recording an image on a recording medium by exposure.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
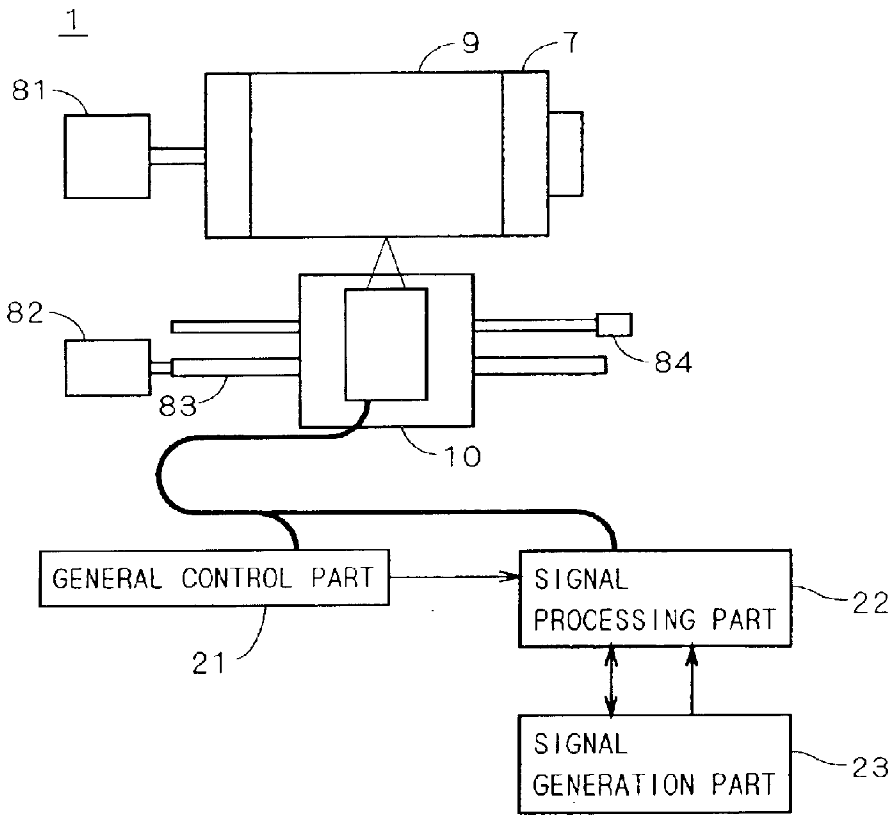
FIG. 1 is a view showing a constitution of an image recording apparatus.

FIG. 1 is a view showing a constitution of an image recording apparatus 1 in accordance with a preferred embodiment of the present invention. The image recording apparatus 1 has an optical head 10 which emits light for recording an image and a holding drum 7 for holding a recording medium 9 on which an image is recorded by exposure. As the recording medium 9, for example, used are a printing plate, a film for forming the printing plate and the like. A photosensitive drum for plateless printing may be used as the holding drum 7 and in this case, it is understood that the recording medium 9 corresponds to a surface of the photosensitive drum and the holding drum 7 holds the recording medium 9 as a unit.

The holding drum 7 rotates about a central axis of its cylindrical surface holding the recording medium 9 by a motor 81 and the optical head 10 thereby travels relatively to the recording medium 9 in a main scan direction. The optical head 10 can be moved by a motor 82 and a ball screw 83 in parallel to a rotation axis of the holding drum 7 in a subscan direction. The position of the optical head 10 is detected by an encoder 84. The motors 81 and 82 and the encoder 84 are connected to a general control part 21, and the general control part 21 controls emission of signal beams from the optical head 10 while driving the motor 81, to record an image on the recording medium 9 on the holding drum 7 by light.

Data of the image to be recorded on the recording medium 9 is prepared in a signal generation part 23 in advance, and a signal processing part 22 receives an image signal in synchronization with the signal generation part 23 on the basis of a control signal from the general control part 21. The signal processing part 22 converts the received image signal into a signal for the optical head 10 and then transmits the signal.

Figure 2:
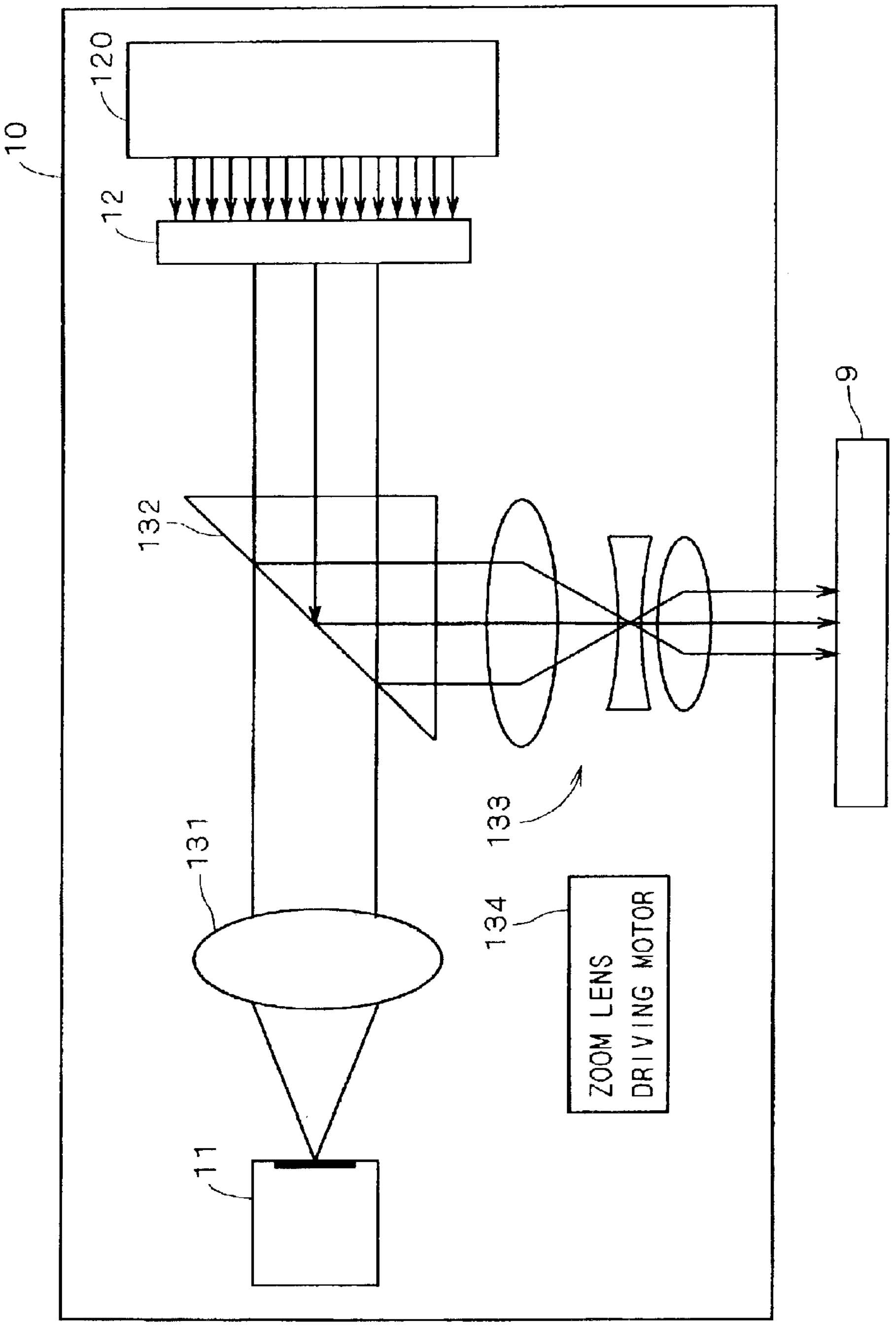
FIG. 2 is a schematic view showing an internal constitution of an optical head.

FIG. 2 is a schematic view showing an internal constitution of the optical head 10. In the optical head 10 disposed are a light source 11 which is a bar-type semiconductor laser, having a plurality of light emitting points which are aligned and a light modurator 12 having a plurality of diffraction grating type light modulator elements which are aligned. Lights from the light source 11 are guided to the light modurator 12 through lenses 131 (actually consisting of a condensing lens, a cylindrical lens and the like) and a prism 132. In this case, the lights from the light source 11 are linear light beams (light beams having a linear section of luminous flux), and applied onto a plurality of light modulator elements which are arranged.

The light modulator elements in the light modulator 12 are individually controlled on the basis of a signal from a device driving circuit 120 and each of the light modulator elements can be changed between a state of emitting a zeroth order diffracted light beam (normally reflected light beam) and a state of emitting non-zeroth order diffracted light beams (mainly first order diffracted light beams ((+1)st order diffracted light beam and (−1)st order diffracted light beam)). The zeroth order diffracted light beam emitted from the light modulator element is returned to the prism 132 and the first order diffracted light beams are guided to directions different from that of the prism 132. The first order diffracted light beams are blocked by a not-shown light shielding part so as not to be stray light.

The zeroth order diffracted light beam from each light modulator element is reflected by the prism 132 and guided to the recording medium 9 outside the optical head 10 through a zoom lens 133 and a plurality of images of the light modulator elements are so formed on the recording medium 9 as to be arranged in the subscan direction. In other words, in the light modulator elements 121, the state of emitting the zeroth order diffracted light beam is an ON state and the state of emitting the first order diffracted light beams are an OFF state. The magnification of the zoom lens 133 can be changed by a zoom lens driving motor 134 and the resolution of the image to be recorded is thereby changed.

Figure 3:
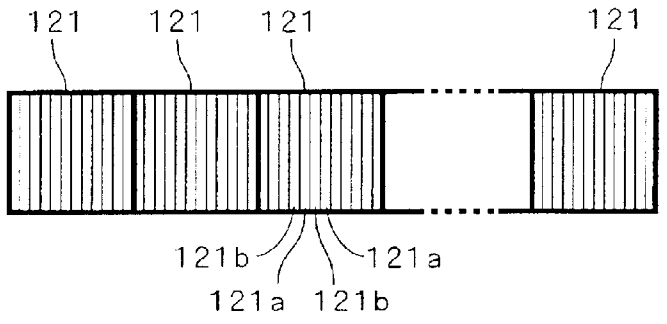
FIG. 3 is an enlarged view of light modulator elements.

FIG. 3 is an enlarged view of the light modulator elements 121 which are arranged. The light modulator element 121 is manufactured by using the semiconductor device manufacturing technique, and each light modulator element 121 is a diffraction grating whose grating depth is changed. In each light modulator element 121, a plurality of moving ribbons **121*a* and a plurality of fixed ribbons 121*b* are alternately arranged in parallel, and the moving ribbons 121*a* can vertically move with respect to a base surface therebehind and the fixed ribbons 121*b*** are fixed with respect to the base surface. As the diffraction grating type light modulator element, for example, the Grating Light Valve (trademarked by Sillicon Light Machine, Sunnyvale, Calif.) is well known.

Figure 4A:
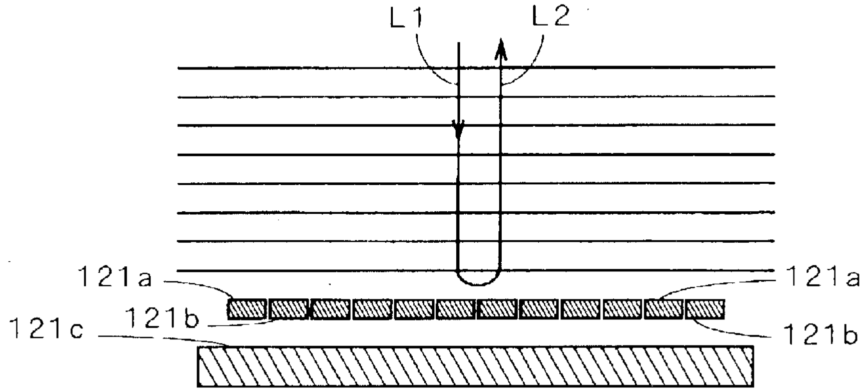
FIG. 4A is a view showing emission of a zeroth order diffracted light beam and FIG. 4B is a view showing emission of first order diffracted light beams.
Figure 4B:
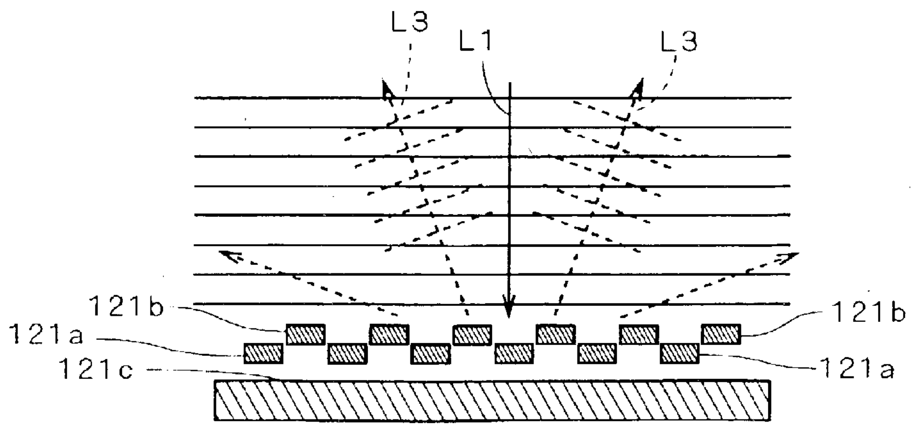

FIGS. 4A and 4B are views each showing a cross section of the light modulator element 121 at a plane perpendicular to the moving ribbons **121*a* and the fixed ribbons 121*b*. As shown in FIG. 4A, when the moving ribbons 121*a* and the fixed ribbons 121*b* are positioned at the same height from a base surface 121*c* (in other words, the moving ribbons 121*a* do not sag), a surface of the light modulator element 121 becomes flush and a reflected light beam of an incident light beam L1 is guided out as a zeroth order diffracted light beam L2. On the other hand, as shown in FIG. 4B, when the moving ribbons 121*a* sag towards the base surface 121*c* with respect to the fixed ribbons 121*b*, the moving ribbons 121*a* serve as bottom surfaces of grooves of the diffraction grating, and first order diffracted light beams L3 (further, high-order diffracted light beams) are guided out from the light modulator element 121 and the zeroth order diffracted light beam L2 disappears. Thus, each light modulator element 121** performs a light modulation using the diffraction grating.

Figure 5:
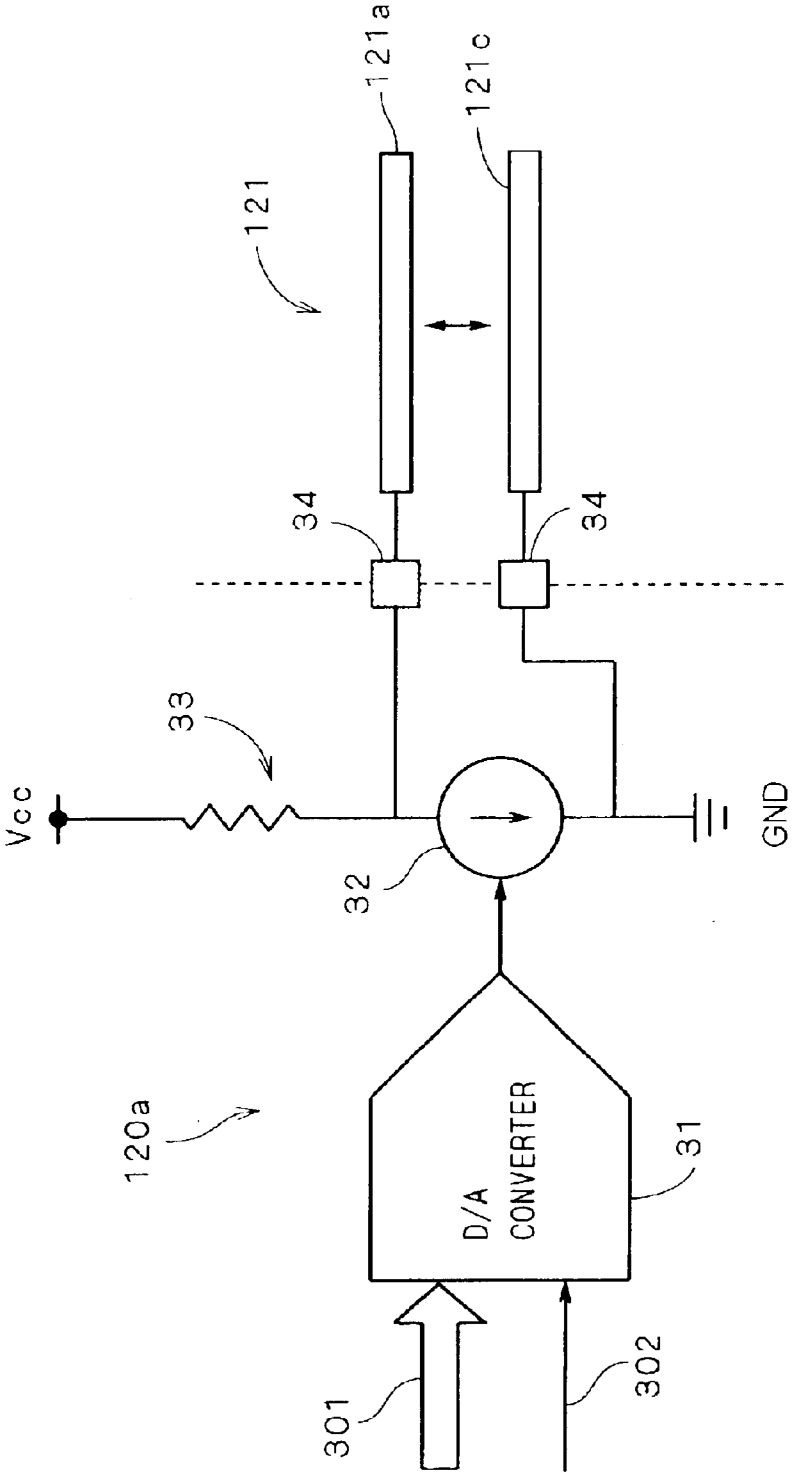
FIG. 5 is a view showing a constitution to drive the light modulator elements.

FIG. 5 is a view of a constitution to drive each light modulator element 121, showing an element (hereinafter, referred to as "driving element **120*a*") used for driving operation in the device driving circuit 120. In the driving element 120*a*, driving voltage data 301 indicating a predetermined voltage and an update clock 302 are inputted to a D/A converter 31. The driving voltage data 301 for each update clock 302 corresponds to a driving voltage for one operation of driving the light modulator element 121. An output from the D/A converter 31 is inputted to a current source 32 and converted into a current. One end of the current source 32 is connected to a side of high potential Vcc through a resistance 33** and the other end is grounded.

Both ends of the current source 32 are also connected to the moving ribbons 121*a* of the light modulator element 121 and the base surface 121*c*, respectively, through connecting pads 34. Therefore, when the driving voltage data 301 is converted into the current through the D/A converter 31 and the current source 32, it is further converted to a driving voltage between both the connecting pads 34 by a voltage drop with the resistance 33. Since there is stray capacitance between the connecting pads 34, the driving voltage changes with the time constant between the connecting pads 34.

Figure 6:
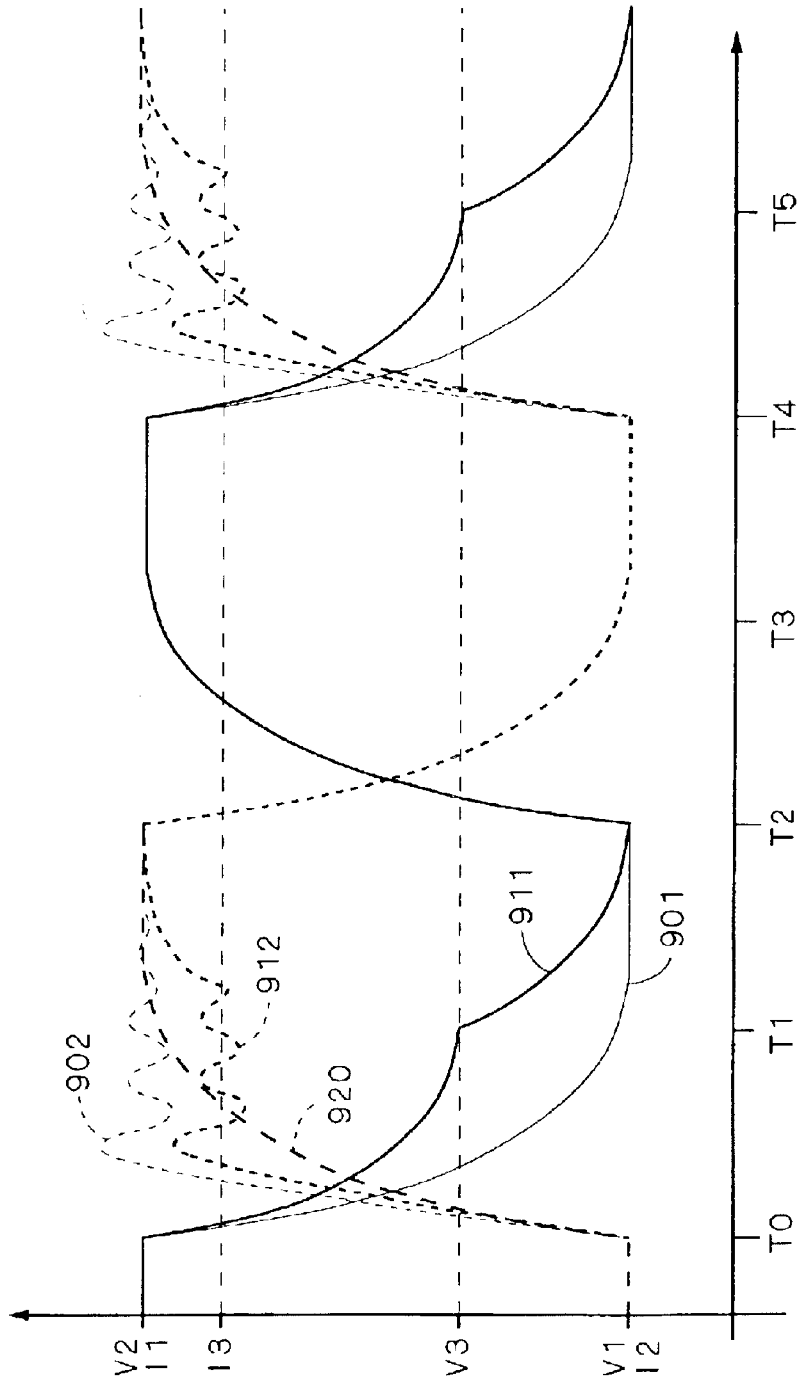
FIG. 6 is a graph showing a relation between a change in driving voltage and an output from the light modulator element.

FIG. 6 is a graph showing a relation between the driving voltage and the intensity (i.e., output) of the signal beam (zeroth order diffracted light beam) from the light modulator element 121, and a thin solid line 901 indicates a change in driving voltage by a background-art method and a thin broken line 902 indicates a change in output in the background art. On the other hand, a thick solid line 911 indicates a change in driving voltage in the present preferred embodiment and a thick broken line 912 indicates a change in output in the present preferred embodiment. In writing clocks (which correspond to the above-discussed update clocks 302) T2 to T4, the solid lines 901 and 911 overlap each other and the broken lines 902 and 912 overlap each other. A thick long broken line 920 shown in the range of writing clock from T0 to T2 indicates an ideal change in output in consideration of the symmetry of the signal beam. FIG. 6 further shows an operation at the time when the light modulator element 121 changes between the ON state and the OFF state in two writing clocks.

In the vertical axis, reference signs V1 and V2 indicate a driving voltage at the time when the light modulator element 121 emits a signal beam and a driving voltage at the time when the light modulator element 121 emits no signal beam, respectively, and I2 (on the same position as V1) indicates an output corresponding to the driving voltage V2 (i.e., 0).

As shown in FIG. 6, when the light modulator element 121 is driven by the background-art method, if the driving voltage falls from V2 to V1 as indicated by the thin solid lint 901 in the range of writing clock from T0 to T2, the output from the light modulator element 121 sharply rises to make an overshoot and then reaches the intensity I1 (on the same position as V2) while oscillating. On the other hand, if the driving voltage rises from V1 to V2 as indicated in the range of writing clock from T2 to T4, the output from the light modulator element 121 smoothly decreases. Such a phenomenon occurs because the driving voltage and the amount of sag of the moving ribbons 121*a* are not in proportion to each other.

Figure 7:
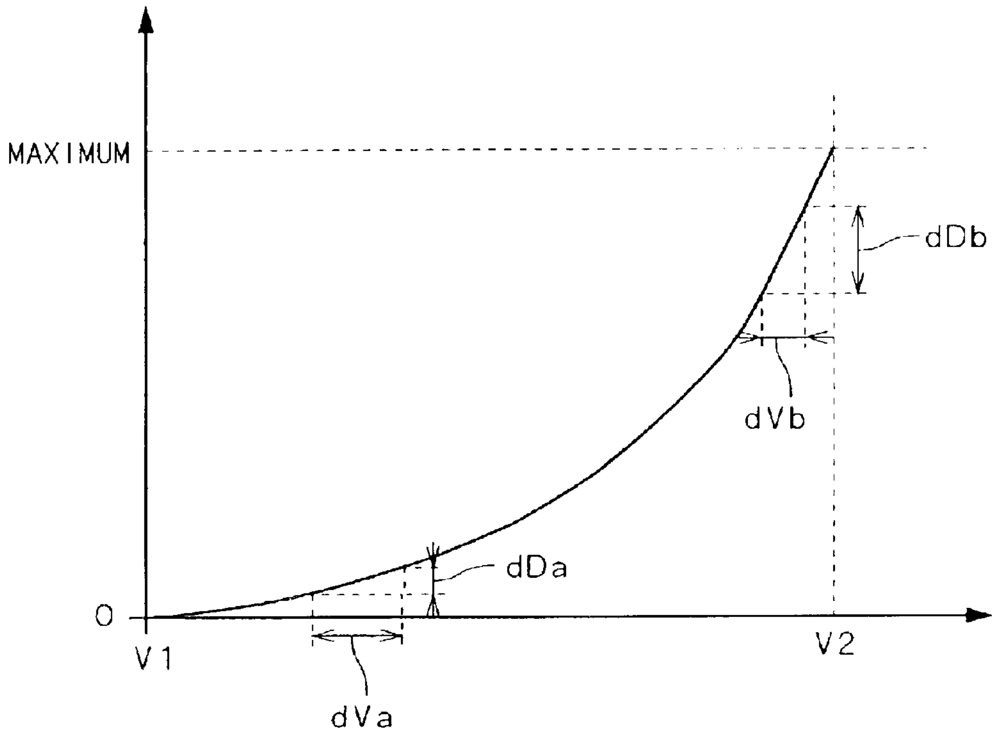
FIG. 7 is a graph showing a relation between a driving voltage and the amount of sag of a moving ribbon.

FIG. 7 is a graph showing a relation between a driving voltage and the amount of sag of the moving ribbon 121*a* (in other words, the level difference between the fixed ribbon 121*b* and the moving ribbon 121*a* with respect to the base surface 121*c*). When the driving voltage is nearly V1 and the light modulator element is almost in the ON state, a change (dDa) in the amount of sag relative to a change (dVa) in driving voltage is very small. In contrast to this, when the driving voltage is nearly V2 and the light modulator element 121 is almost in the OFF state, a change (dDb) in the amount of sag relative to a change (dVb) in driving voltage is large.

Therefore, if the driving voltage simply increases and decreases like in the background-art method, an excessive acceleration is applied to the moving ribbons 121*a* when the driving voltage sharply falls from V2, and the output from the light modulator element 121 sharply changes as indicated by the thin broken line 902 of FIG. 6 in the range of writing clock from T0 to T1 and oscillates due to the effect of the moving ribbons 121*a* which can not follow the sharp change in driving voltage. As a result, the output from the light modulator element 121 draws a curve largely beyond the ideal change in output (indicated by the broken line 920).

The light response characteristics of the recording medium 9 is based on an integral value of the light intensity (i.e., energy per area) on main scanning of an irradiation area, and therefore in the characteristic indicated by the thin broken line 902, a writing (photosensitive) area becomes larger than a blank area even if the change between ON/OFF states is periodically repeated.

When the driving voltage rises from V1 to V2, since the acceleration applied to the moving ribbons 121*a* at an early stage of the change is small, the light modulator element 121 changes into the OFF state, following a waveform of the driving voltage.

In the image recording apparatus 1 of the present invention, in order to change the output from the light modulator element 121 into an optimum form, an auxiliary driving voltage V3 is temporarily applied to the light modulator element 121 at the writing clock T1 as indicated by the thick solid line 911 of FIG. 6, and after that, the driving voltage V1 is applied thereto towards the writing clock T2. The auxiliary driving voltage V3 takes a value between the driving voltage V1 applied to bring the light modulator element 121 into the ON state (hereinafter, referred to as "first driving voltage") and the driving voltage V2 applied to bring the light modulator element 121 into the OFF state (hereinafter, referred to as "second driving voltage").

With this, as indicated by the thick broken line 912, the output from the light modulator element 121 is temporarily suppressed to near the intensity I3 in the range of writing clock from T0 to T1 and then smoothly changes towards the intensity I1 in the range of writing clock from T1 to T2. As a result, the recording medium 9 is supplied with an energy equivalent to the energy supplied thereto at the ideal output change and an appropriate image recording is thereby achieved.

Figure 8:
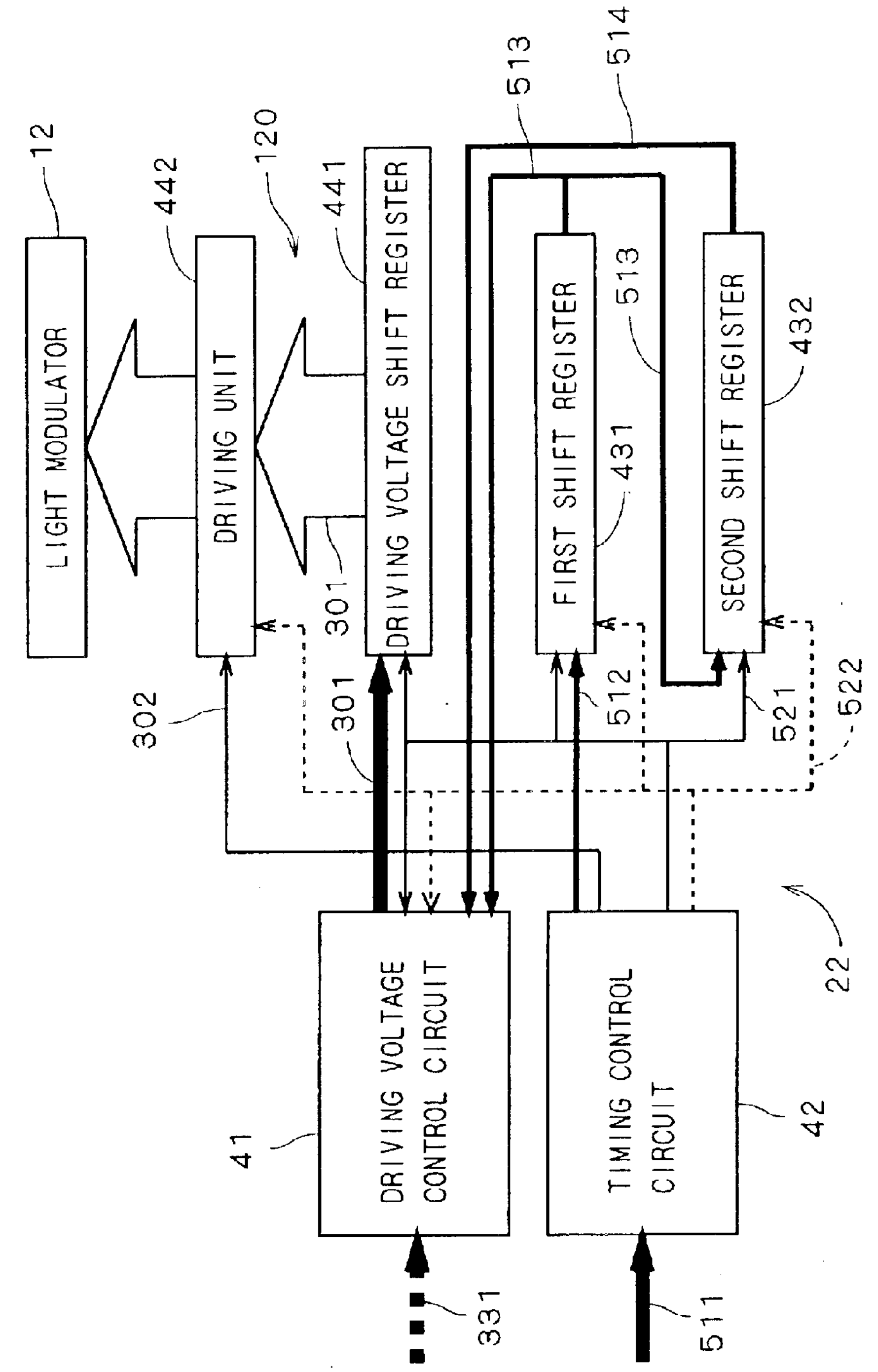
FIG. 8 is a block diagram showing constitutions of a signal processing part and a device driving circuit.

FIG. 8 is a block diagram showing constitutions of the signal processing part 22 (see FIG. 1) and the device driving circuit 120 together with the light modulator 12. The signal processing part 22 has a driving voltage control circuit 41 having a table for the driving voltages, a timing control circuit 42 to which an image signal 51 is inputted from the signal generation part 23, a first shift register 431 which sequentially stores pixel data 512 outputted from the timing control circuit 42 and a second shift register 432 which sequentially stores pixel data 513 outputted from the first shift register 431. The device driving circuit 120 has a driving voltage shift register 441 which sequentially stores driving voltage data 301 outputted from the driving voltage control circuit 41 and a driving unit 442 in which the driving elements 120*a* are arranged as shown in FIG. 5.

From the timing control circuit 42, the pixel data 512 for instructing each light modulator element 121 of ON/OFF and a shift clock 521 are outputted, and the shift clock 521 is inputted to the driving voltage control circuit 41, the first shift register 431, the second shift register 432 and the driving voltage shift register 441. A control signal 522 is also outputted from the timing control circuit 42 and given to the elements.

The first shift register 431 stores the pixel data 512 while shifting the data 512 in synchronization with the shift clock 521. Thus, the first shift register 431 can store the pixel data as many as the light modulator elements 121 at one time. Then, the first shift register 431 outputs pixel data 513 which is first inputted thereto among the stored pixel data to the driving voltage control circuit 41 and the second shift register 432 in synchronization with the shift clock 521. The second shift register 432 can also store the pixel data as many as the light modulator elements 121 at one time, and outputs pixel data 514 which is first inputted thereto among the stored pixel data to the driving voltage control circuit 41 in synchronization with the shift clock 521. In the first and second shift registers 431 and 432, zeros (data indicating OFF) are stored in advance as initial values.

Figure 9:
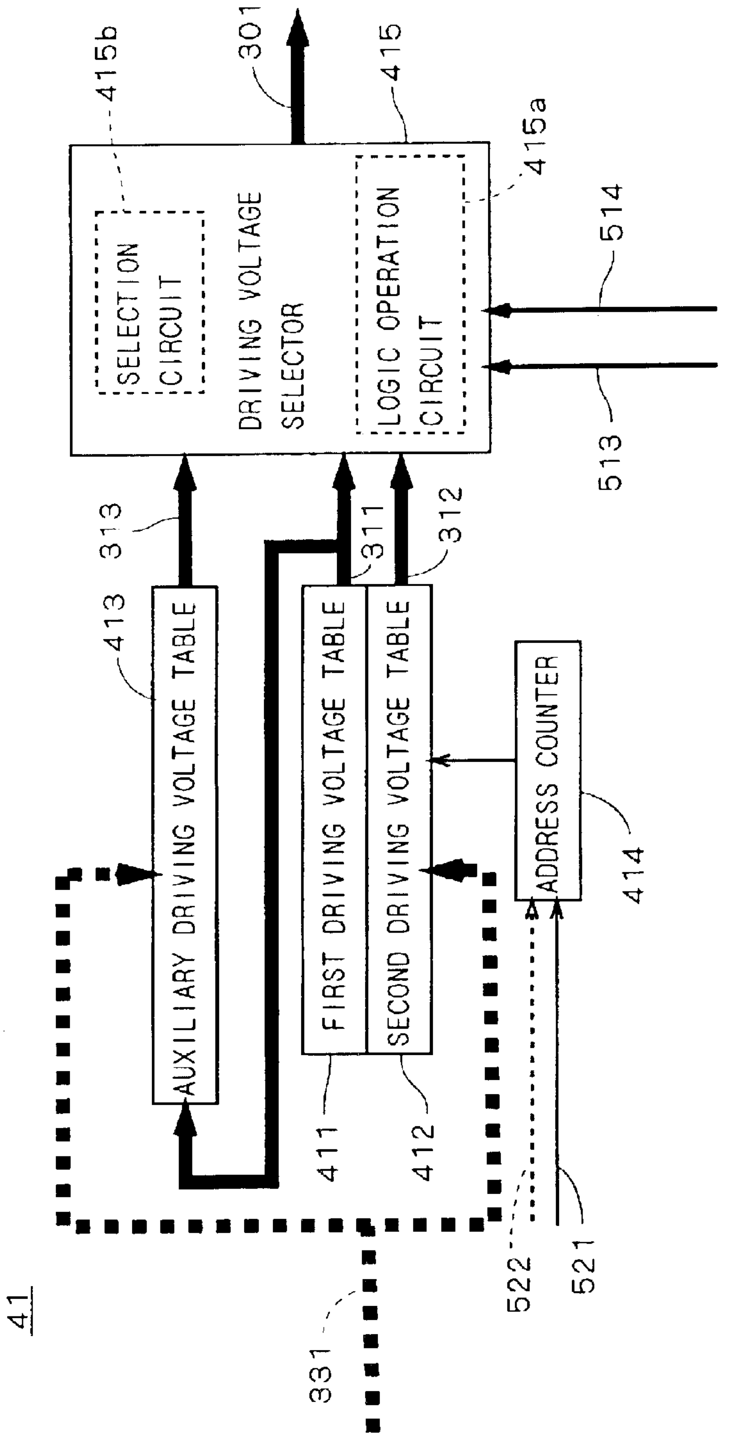
FIG. 9 is a block diagram showing a constitution of a driving voltage control circuit.

The driving voltage control circuit 41 is a circuit for generating the driving voltage data 301 which corresponds to the driving voltage supplied for each light modulator element 121, to which look-up table (LUT) data 331 is inputted in advance. FIG. 9 is a block diagram showing a constitution of the driving voltage control circuit 41.

The driving voltage control circuit 41 has a first driving voltage table 411 ("table" correctly refers to a "memory" storing the table, but the memory is referred to simply as "table" in the following discussion) for storing data (hereinafter, referred to as a "first driving voltage data") which corresponds to the first driving voltages which are applied to bring light modulator elements 121 into the ON state, a second driving voltage table 412 for storing data (hereinafter, referred to as a "second driving voltage data") which corresponds to the second driving voltages which are applied to bring light modulator elements 121 into the OFF state, and an auxiliary driving voltages table 413 for storing data (hereinafter, referred to as an "auxiliary driving voltage data") which corresponds to the auxiliary driving voltages (which correspond to the voltage V3 in FIG. 6). The driving voltage control circuit 41 is further provided with an address counter 414 for specifying the light modulator element 121 to be controlled by the final driving voltage data 301 and a driving voltage selector 415 for making a selection of the driving voltage data to be inputted from the LUTs.

The first driving voltage data is separately obtained in advance for each light modulator element 121 as the first driving voltage which equalizes the intensity of light beams from the light modulator elements 121 which are in the ON state, and the second driving voltage data is separately obtained in advance for each light modulator element 121 as the second driving voltage which makes the intensity of light beams zero, which are outputted from the light modulator elements 121 which are in the OFF state. The auxiliary driving voltage data is obtained as data indicating the auxiliary driving voltages as many as the kinds (values) of the first driving voltages.

Then, the first driving voltage data, the second driving voltage data and the auxiliary driving voltage data which are prepared as the LUT data 331 are inputted to the driving voltage control circuit 41 and stored in the first driving voltage table 411, the second driving voltage table 412 and the auxiliary driving voltage table 413, respectively. Since the auxiliary driving voltages are determined in advance with reference to the driving voltages supplied to the light modulator elements 121 which are in the ON state, the auxiliary driving voltage table 413 stores data which corresponds to the relation (correspondence) between a plurality of first driving voltages and a plurality of auxiliary driving voltages.

When the shift clock 521 and the control signal 522 are inputted to the driving voltage control circuit 41, the light modulator element 121 corresponding to the driving voltage data 301 which is outputted is first specified by the address counter 414 (in other words, the addresses of the first driving voltage table 411 and the second driving voltage table 412 corresponding to the light modulator element 121 to be controlled are specified).

With this, the first driving voltage table 411 and the second driving voltage table 412 output the first driving voltage data 311 and the second driving voltage data 312 corresponding to the objective light modulator element 121 to the driving voltage selector 415, respectively. On the other hand, the first driving voltage data 311 is inputted to the auxiliary driving voltage table 413 and the auxiliary driving voltage data 313 corresponding to the first driving voltage data 311 is also inputted to the driving voltage selector 415.

The pixel data 513 and 514 are inputted from the first shift register 431 and the second shift register 432, respectively, to the driving voltage selector 415. On the basis of these pixel data, one of the first driving voltage data 311, the second driving voltage data 312 and the auxiliary driving voltage data 313 is selected and outputted to the driving voltage shift register 441 (see FIG. 8) as the driving voltage data 301.

The pixel data 513 outputted from the first shift register 431 corresponds to a state of the light modulator element 121 after being controlled by the driving voltage data 301. In other words, the pixel data 513 is data for indicating the state of the light modulator element 121 after being controlled from this time on. The pixel data 514 outputted from the second shift register 432, which is inputted to the driving voltage control circuit 41 behind the pixel data 513 by the number of light modulator elements 121, is data which corresponds to a current state of the light modulator element 121 (after being controlled in the past). Then, on the basis of the values of the pixel data 513 and 514, the driving voltage selector 415 determines the driving voltage data 301 in accordance with the rule of Table 1. In Table 1, "0" is the pixel data indicating the OFF state and "1" is the pixel data indicating the ON state.

TABLE 1

| Pixel Data 514 | Pixel Data 513 | Selected Driving Voltage Data |
|---|---|---|
| 0 | 0 | Second Driving Voltage Data |
| 1 | 0 | Second Driving Voltage Data |
| 0 | 1 | Auxiliary Driving Voltage Data |
| 1 | 1 | First Driving Voltage Data |

As shown in Table 1, when the light modulator element 121 keeps the OFF state or changes from the ON state to the OFF state, the second driving voltage data 312 is adopted as the driving voltage data 301. When the light modulator element 121 keeps the ON state, the first driving voltage data 311 is adopted as the driving voltage data 301. When the light modulator element 121 changes from the OFF state to the ON state, the auxiliary driving voltage data 313 is adopted as the driving voltage data 301.

The determined driving voltage data 301 are sequentially stored into the driving voltage shift register 441 shown in FIG. 8 in synchronization with the shift clock 521. The process operation up to this point is a serial process, but when the driving voltage data 301 as many as the light modulator elements 121 are stored into the driving voltage shift register 441, the driving voltage data 301 are transferred to the driving unit 442 and when the update clock 302 is inputted from the timing control circuit 42 to the driving unit 442, the driving unit 442 simultaneously supplies each light modulator element 121 with the driving voltage in accordance with the driving voltage data 301 through the operation discussed with reference to FIG. 5.

With this, when the light modulator element 121 changes from the OFF state to the ON state (changes from the state where the amount of sag of the moving ribbons is large with respect to the change in driving voltage to the state where the amount of sag is small), the auxiliary driving voltage V3 shown in FIG. 6 is temporarily supplied to the light modulator element 121, and the output of the light modulator element 121 is approximated to a change of optimal form. As a result, it is possible to make a precise correspondence between the ON/OFF control and the beam writing result and increase the line space ratio in the main scan direction (the area ratio between a linear area (which is longer in the subscan direction) which is sequentially written in the main scan direction when all the light modulator elements 121 are turned ON/OFF at the same time per unit of time for writing and a blank area) (i.e., approximate the line space ratio to 1).

Figure 10:
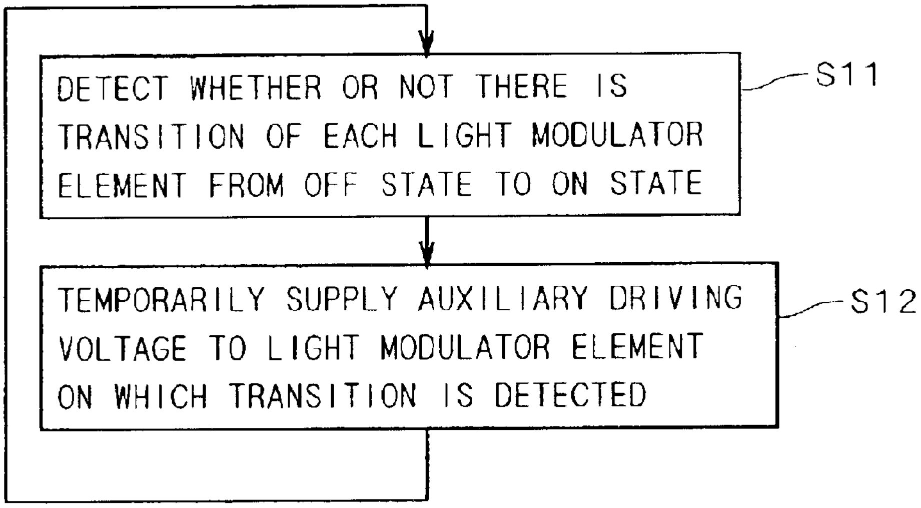
FIG. 10 is a flowchart showing an operation flow for controlling the light modulator elements.

When the above operation is seen from a functional point of view with reference to FIG. 10, the second shift register 432 is a memory for storing a state of a plurality of light modulator elements 121 at one point in time and the first shift register 431 is a memory for storing a state of a plurality of light modulator elements 121 at the next point in time (one writing clock later), and a logic operation circuit 415*a* in the driving voltage selector 415 uses the stored contents in these shift registers as selection conditions to detect whether or not there is a transition of each light modulator element 121 from the OFF state to the ON state, (Step S11). Then, a selection circuit 415*b* in the driving voltage selector 415 uses the signals from the first driving voltage table 411, the second driving voltage table 412 and the auxiliary driving voltage table 413 as selection objects to select the driving voltage, and a control is thereby made on the light modulator elements 121 which change from the OFF state to the ON state by temporarily supplying the auxiliary driving voltages thereto (Step S12).

Since the initial values, zeros, are set to the first shift register 431 and the second shift register 432, the transition from the OFF state to the ON state is detected immediately after the beam writing (image recording) starts.

Though the auxiliary driving voltage may be determined for each light modulator element 121, the value of the first driving voltage supplied to the light modulator element 121 which changes to the ON state and the value of the auxiliary driving voltage are in a one-to-one correspondence and the number of values which the first driving voltages may take is smaller than the number of light modulator elements 121. Therefore, in the image recording apparatus 1, the auxiliary driving voltage table 413 stores the correspondence between the first driving voltages and the auxiliary driving voltages to achieve reduction in storage capacity of the auxiliary driving voltage table 413.

Though FIG. 6 shows a case where the light modulator element 121 changes between the ON state and the OFF state in two writing clocks, the light modulator element 121 may change between the ON state and the OFF state in one writing clock. In this case, when the light modulator element 121 makes sequential changes in state of OFF, ON, OFF in three writing clocks, the driving voltage makes changes of V2, V3, V2.

Figure 11:
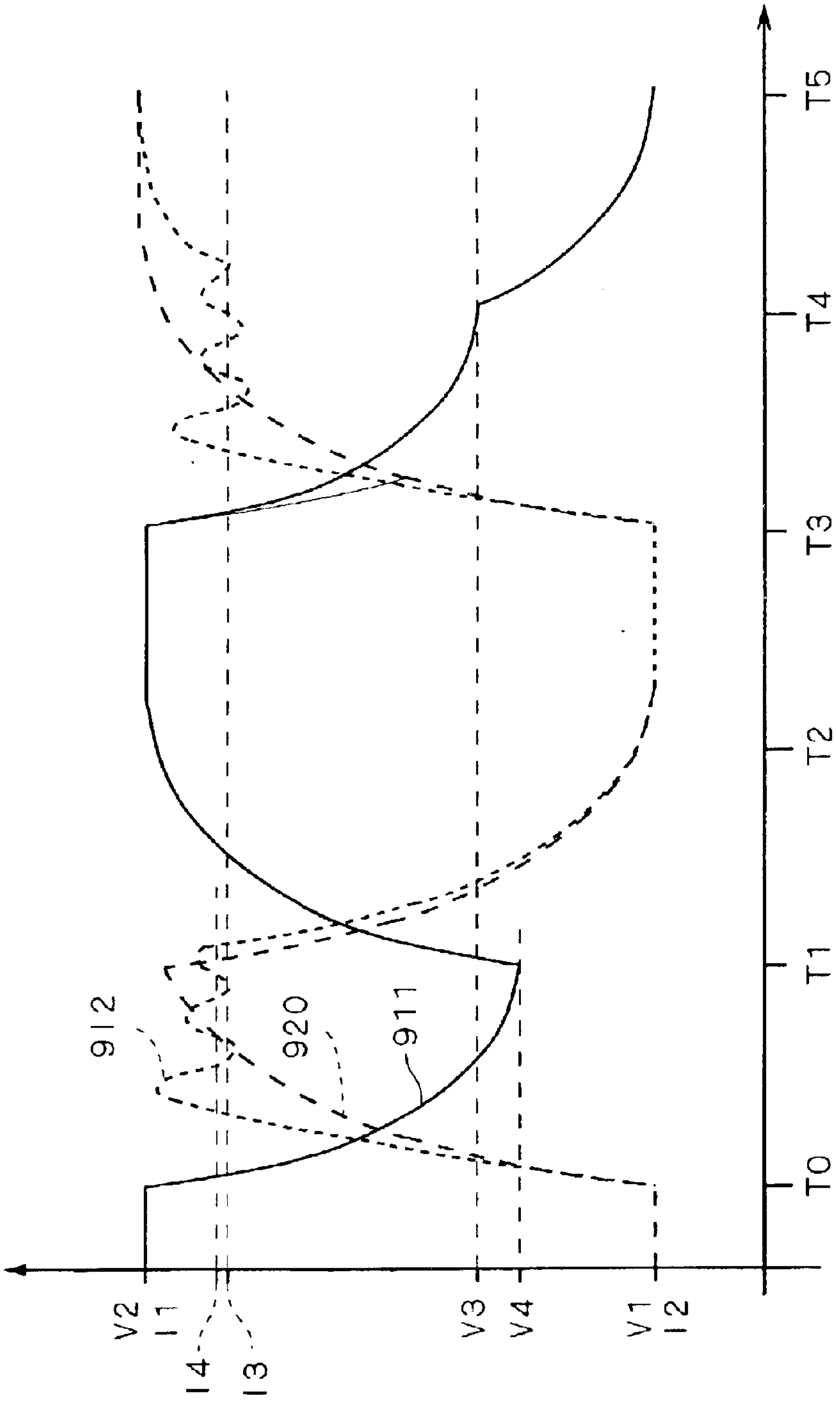
FIG. 11 is a graph showing another exemplary operation of the image recording apparatus.

Next, another exemplary operation of the image recording apparatus 1 will be discussed. FIG. 11 is a graph showing another exemplary operation, and reference signs I1 to I3 and V1 to V3 in the vertical axis indicate the same as those in FIG. 6. The thick solid line 911 indicates the change in driving voltage in the image recording apparatus 1, and the thick broken line 912 indicates the change in output in the image recording apparatus 1 and the thick long broken line 920 shown in the range of writing clock from T0 to T2 indicates a preferable change in output of the signal beam. In FIG. 11, the light modulator element 121 changes from the OFF state to the ON state in the range of writing clock from T0 to T1 and changes from the ON state to the OFF state in the range of writing clock from T1 to T2. The operation of the light modulator element 121 in the range of writing clock from T3 to T5 is the same as that in the range of writing clock from T0 to T2 of FIG. 6.

In the operation of FIG. 11, when the light modulator element 121 sequentially changes into OFF, ON, OFF every one writing clock, an auxiliary driving voltage V4 is supplied to bring the light modulator element 121 into the ON state. In the following discussion, the two auxiliary driving voltages V3 and V4 are referred to as "the first auxiliary driving voltage" and "the second auxiliary driving voltage", respectively, as distinguished from each other.

The second auxiliary driving voltage V4 has a smaller value than the first auxiliary driving voltage V3 supplied at the writing clock T4 (in other words, supplied when the light modulator element 121 sequentially changes into OFF, ON, ON). As a result, the approximate light intensity I4 which is an output of the light modulator element 121 at the time when the second auxiliary driving voltage V4 is supplied thereto is higher than the intensity I3 at the time when the first auxiliary driving voltage V3 is supplied thereto. With this, the energy outputted from the light modulator element 121 in the range of writing clock from T0 to T1 is approximated to the energy in the preferable output indicated by the thick long broken line 920 and appropriate beam writing on the recording medium 9 is thereby achieved.

Though not shown, in the background-art method, the driving voltage sequentially changes into V2, V1, V2 in the range of writing clock from T0 to T2 and the intensity of light outputted from the light modulator element 121 becomes nearly I1, which is largely different from the preferable output.

Figure 12:
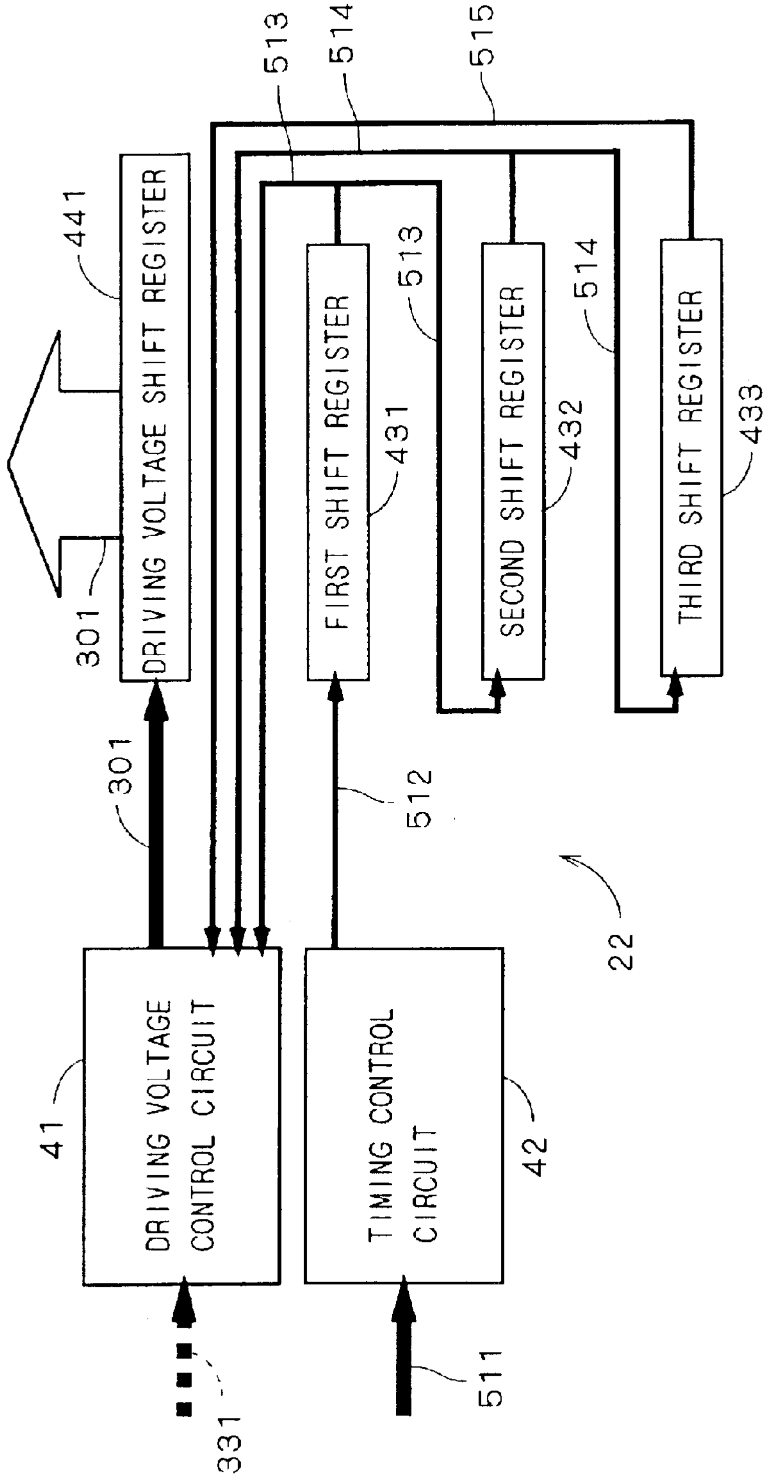
FIG. 12 is a block diagram showing a constitution of the signal processing part and a driving voltage shift register.

FIG. 12 is a block diagram showing a constitution of the signal processing part 22 and the driving voltage shift register 441 in the image recording apparatus 1. In FIG. 12, the clock signals are omitted. In the signal processing part 22 of FIG. 12, a third shift register 433 is additionally provided in the signal processing part 22 of FIG. 8 and accordingly the driving voltage control circuit 41 has a different internal constitution. Other constituents are the same as those of FIG. 8 and are represented by the same reference signs.

In the signal processing part 22 of FIG. 12, the three shift registers are connected in series to one another and pixel data from these shift registers are inputted to the driving voltage control circuit 41. Therefore, the pixel data 514 from the second shift register 432 lags behind the pixel data 513 from the first shift register 431 by the number of light modulator elements 121, and pixel data 515 from the third shift register 433 lags behind the pixel data 514 from the second shift register 432 by the number of light modulator elements 121. As a result, the three pixel data 513 to 515 which are simultaneously inputted to the driving voltage control circuit 41 indicate the states of the specified light modulator element 121 for three writing clocks. The pixel data 514 from the second shift register 432 is data indicating a state of the light modulator element 121 after the next update clock 302.

Figure 13:
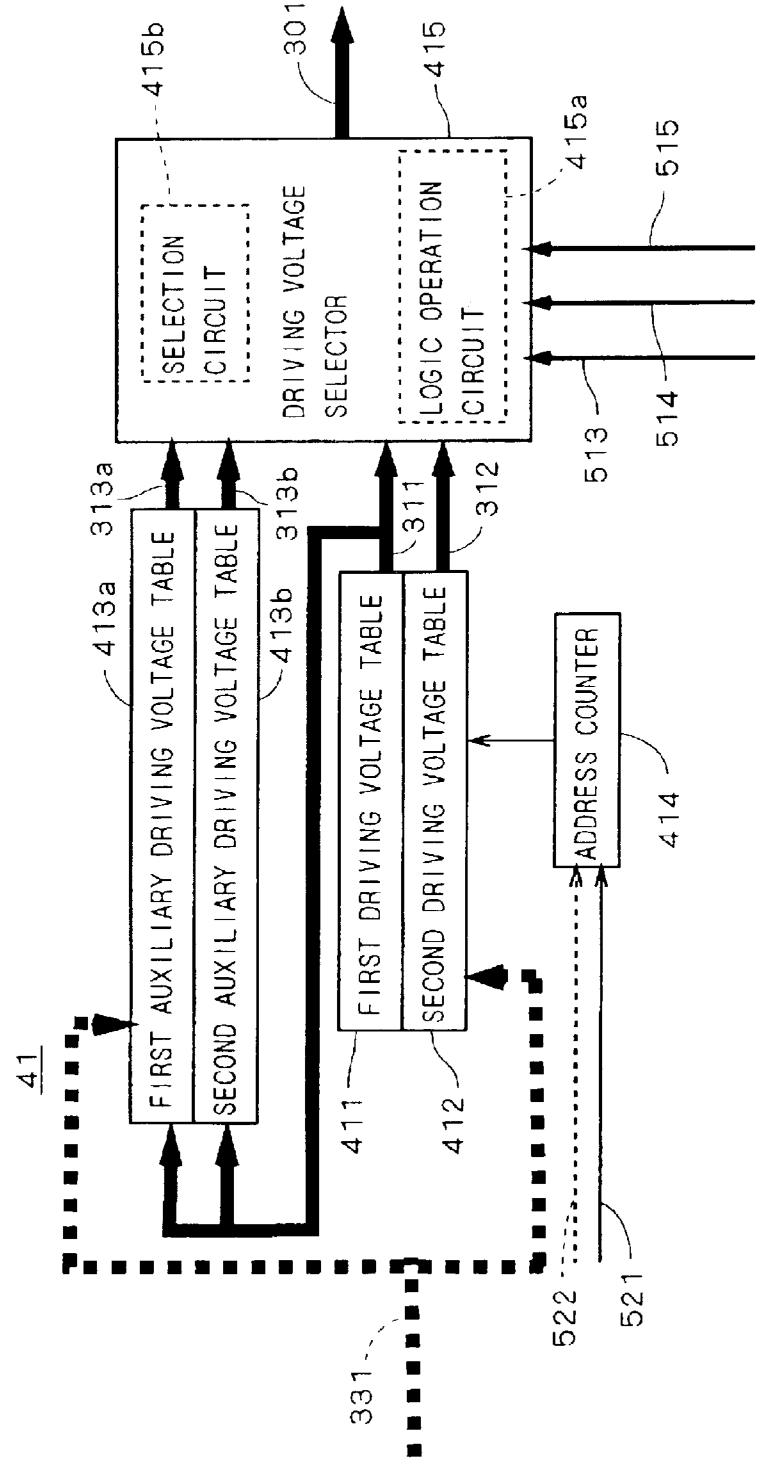
FIG. 13 is a block diagram showing another constitution of the driving voltage control circuit.

FIG. 13 is a block diagram showing another constitution of the driving voltage control circuit 41. The driving voltage control circuit 41 of FIG. 13 is different from that of FIG. 9 in that a first auxiliary driving voltage table 413*a* and a second auxiliary driving voltage table 413*b* are provided therein and the three pixel data 513 to 515 are inputted to the driving voltage selector 415.

The first driving voltage table 411 and the second driving voltage table 412 store data corresponding to the first driving voltages and the second driving voltages for bringing the light modulator elements 121 into the ON state and the OFF state, respectively. The first auxiliary driving voltage table 413*a* stores data corresponding to the relation (correspondence) between the values of the first driving voltages and the first auxiliary driving voltages and the second auxiliary driving voltage table 413*b* stores data corresponding to the relation (correspondence) between the values of the first driving voltages and the second auxiliary driving voltages. In other words, the first auxiliary driving voltage and the second auxiliary driving voltage can be determined on the basis of the first driving voltage. Then, the first driving voltage data 311, the second driving voltage data 312, the first auxiliary driving voltage data 313*a* and the second auxiliary driving voltage data 313*b* are inputted to the driving voltage selector 415 for each shift clock 521 in accordance with the address from the address counter 414.

Figure 14:
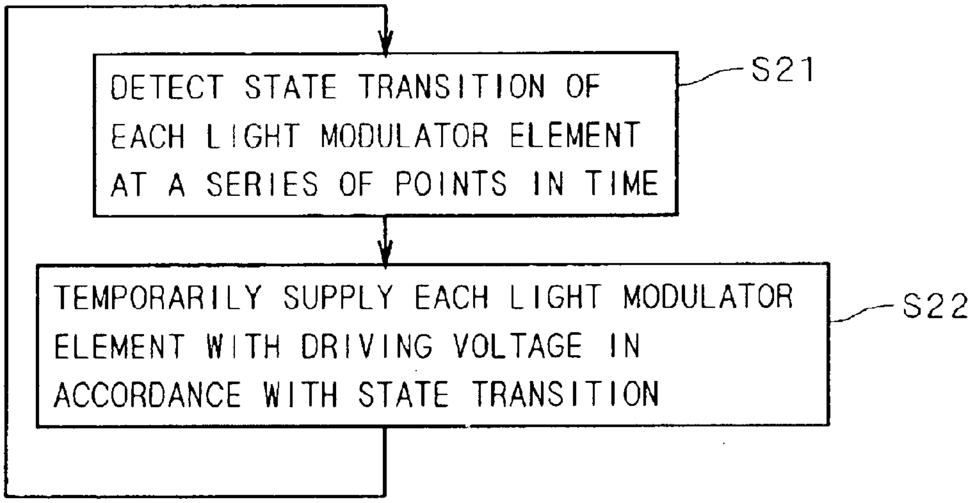
FIG. 14 is a flowchart showing another operation flow for controlling the light modulator elements.

The logic operation circuit 415*a* of the driving voltage selector 415 detects a series of state transitions of each light modulator element 121 on the basis of the pixel data 513 to 515 which are selection conditions in accordance with the rule of Table 2 as shown in FIG. 14 (Step S21), and the selection circuit 415*b* determines the driving voltage data 301 out of the first driving voltage data 311, the second driving voltage data 312, the first auxiliary driving voltage data 313*a* and the second auxiliary driving voltage data 313*b* which are selection objects (Step S22).

TABLE 2

| Pixel Data 515 | Pixel Data 514 | Pixel Data 513 | Selected Driving Voltage Data |
|---|---|---|---|
| 0 | 0 | 0 | Second Driving Voltage Data |
| 1 | 0 | 0 | Second Driving Voltage Data |
| 0 | 1 | 0 | Second Auxiliary Driving Voltage Data |
| 1 | 1 | 0 | First Driving Voltage Data |
| 0 | 0 | 1 | Second Driving Voltage Data |
| 1 | 0 | 1 | Second Driving Voltage Data |
| 0 | 1 | 1 | First Auxiliary Driving Voltage Data |
| 1 | 1 | 1 | First Driving Voltage Data |

Specifically, the first auxiliary driving voltage data 313*a* is adopted as the driving voltage data 301 when the light modulator element 121 makes the sequential changes of OFF, ON, ON for each writing clock and is first brought into the ON state (middle state), and the second auxiliary driving voltage data 313*b* is adopted as the driving voltage data 301 when the light modulator element 121 makes the sequential changes of OFF, ON, OFF for each writing clock and is first brought into the ON state (middle state). This achieves an operation of supplying each light modulator element with the driving voltage in accordance with the state transition at a series of points in time as shown in FIG. 11 and appropriate beam writing on the recording medium 9.

Figure 15:
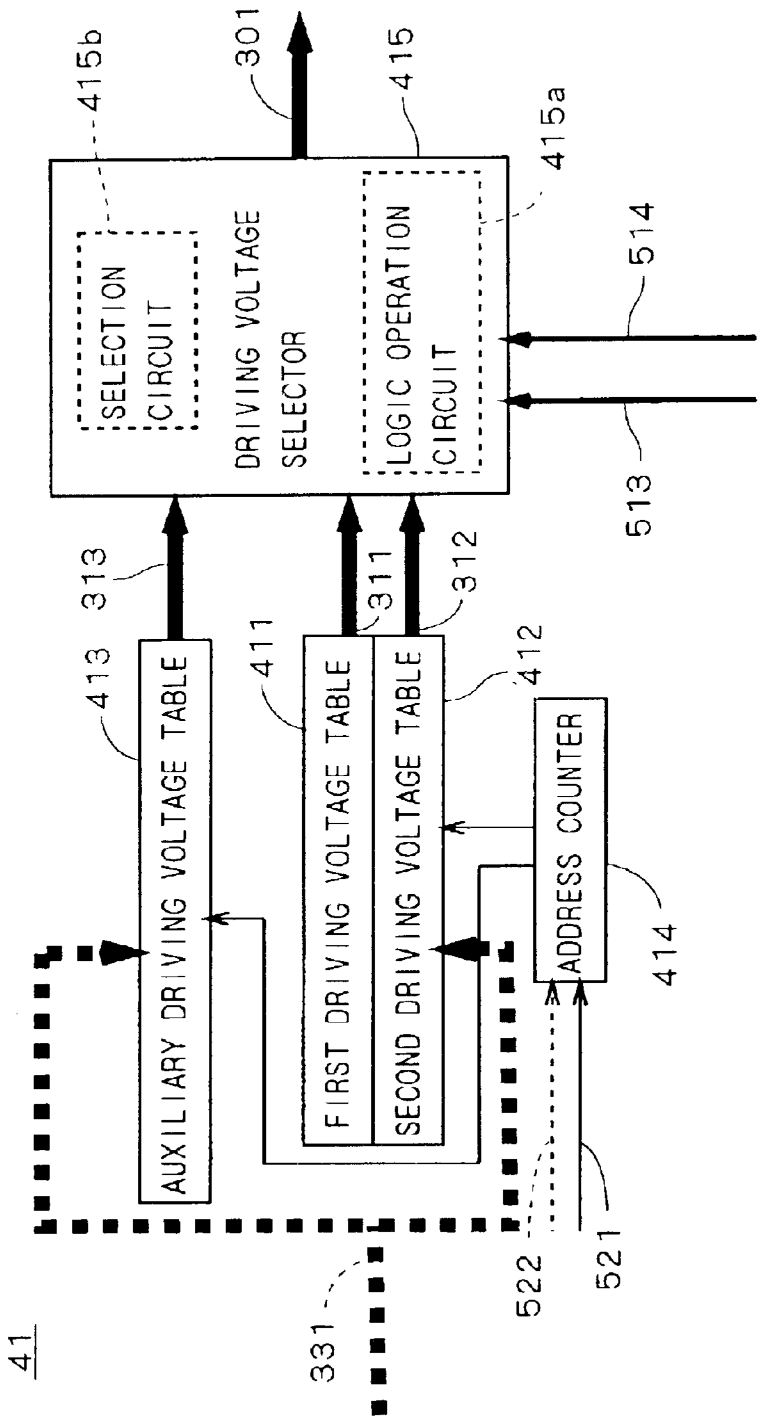
FIGS. 15 and 16 are block diagrams showing other constitutions of the driving voltage control circuit.

Though the auxiliary driving voltage table 413 of FIG. 9 stores data indicating the auxiliary driving voltages as many as the kinds (values) of the first driving voltages and the auxiliary driving voltage is obtained with reference to the first driving voltage in the above preferred embodiment, the auxiliary driving voltage table 413 may store the auxiliary driving voltages corresponding to the light modulator elements 121 which are sequentially pointed by the address counter 414. In this case, an address signal from the address counter 414 is inputted to the auxiliary driving voltage table 413 in order to specify the auxiliary driving voltage as shown in FIG. 15. This makes it possible to remove effects of values of the second driving voltage table and ununiformity in illumination system.

Figure 16:
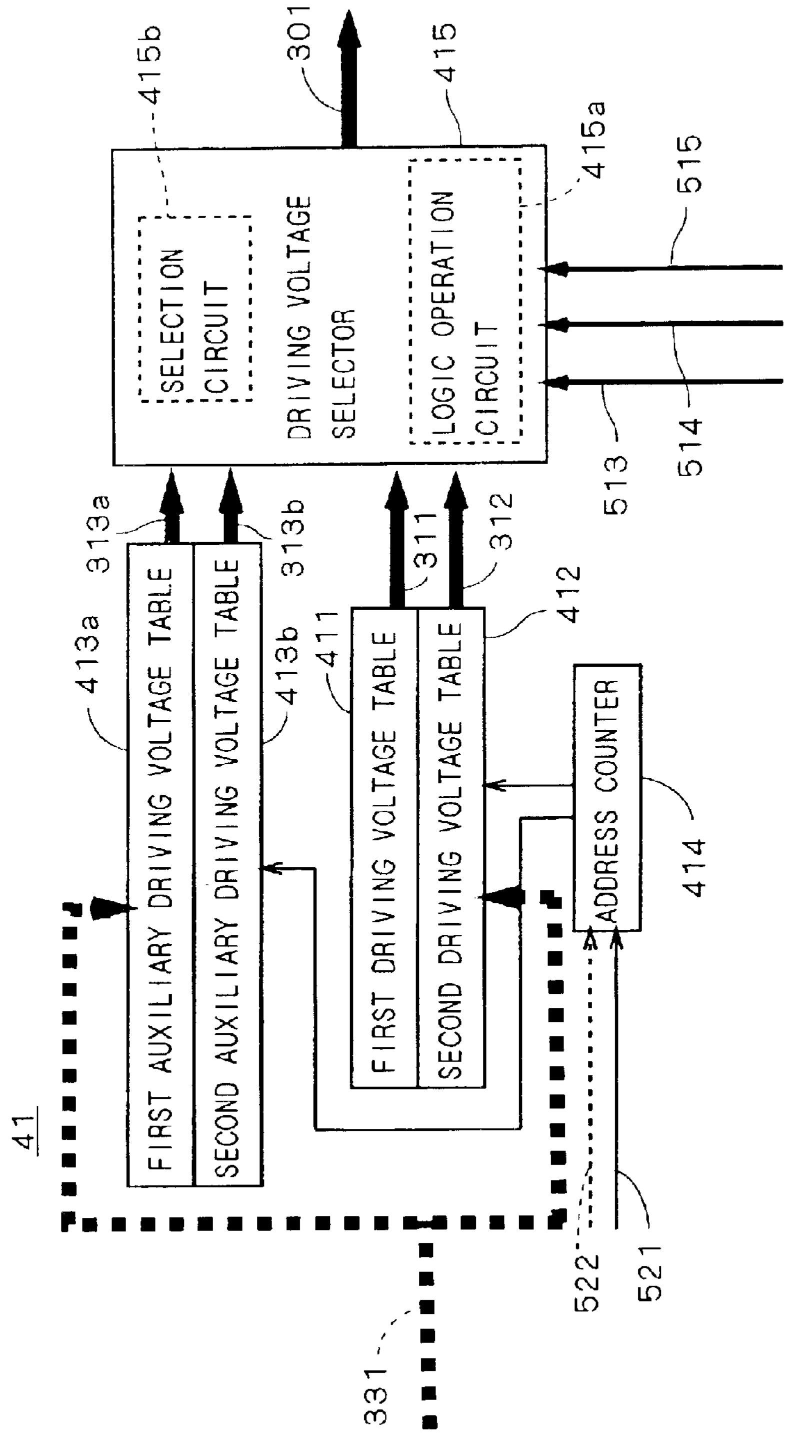

Also in the case of FIG. 13, the first auxiliary driving voltage table 413*a* and the second auxiliary driving voltage table 413*b* may store the first and second auxiliary driving voltages, respectively, in accordance with the state transition of each light modulator element 121 at a series of points in time, and in this case, the address signal from the address counter 414 is inputted to the first auxiliary driving voltage table 413*a* and the second auxiliary driving voltage table 413*b* as shown in FIG. 16.

Though the preferred embodiment of the present invention have been discussed above, the present invention is not limited to the above-discussed preferred embodiment, but allows various variations.

The recording medium 9 may be traveled by other methods only if it can move relatively to the optical head 10. For example, there may be a constitution in which the recording medium 9 is held on a planar stage and the stage can be traveled relatively to the optical head 10.

The constitutions of circuits shown in FIGS. 8, 9, 12, 13, 15 and 16 are examples, and other constitution may be adopted and part of it may be achieved by software.

If the moving ribbons 121*a* and the fixed ribbons 121*b* can be regarded as strip-like reflection surfaces, these surfaces do not have to be in a ribbon shape in a strict meaning. For example, an upper surface of a block shape may serve as the reflection surface of a fixed ribbon.

Though the auxiliary driving voltage is distinguished from the first driving voltage in the above preferred embodiment, the auxiliary driving voltage may be regarded as a kind of first driving voltage for bringing the light modulator element 121 into the ON state. If the auxiliary driving voltage is regarded as the first driving voltage, it is understood that the first driving voltage is changed in accordance with the state transition of the light modulator element 121 in the above preferred embodiment.

Four or more shift registers may be used, and the pixel data indicating the state after the next update clock 302 may be outputted from any one of the shift registers. In other words, there may be a case where the state transition at a series of points in time, i.e., past, present and future (alternatively, past and present or present and future) is detected and the driving voltage (auxiliary driving voltage) is determined in accordance with the state transition. In this case, the auxiliary driving voltage memory may store data corresponding to the relation (correspondence) between the state transition at a series of points in time and a plurality of auxiliary driving voltages or may store a plurality of auxiliary driving voltages in accordance with the state transition of each light modulator element at a series of points in time.

Though the zeroth order diffracted light beam is used as the signal beam in the beam writing in the above preferred embodiment, the first order diffracted light beams may be used as the signal beam. Unlike the relative positional relation between the moving ribbons 121*a* which are not sagged and the fixed ribbons 121*b* in the above preferred embodiment, the light modulator element 121 which emits the zeroth order diffracted light beam in the state where the moving ribbons 121$a$ sag may be used. In these cases, by detecting whether or not there is a transition from the state where the amount of sag of the moving ribbons is large with respect to the change in driving voltage to the state where the amount of sag is small and temporarily supplying the auxiliary driving voltage between the driving voltage on non-emission of the signal beam and the driving voltage on emission of the signal beam, it is possible to suppress an excessive initial acceleration applied to the moving ribbons 121$a$ and achieve an appropriate image recording.

While the invention has been shown and described in detail, the foregoing description is in all aspects illustrative and not restrictive. It is therefore understood that numerous modifications and variations can be devised without departing from the scope of the invention.

What is claimed is:

1. An image recording apparatus for recording an image on a recording medium by exposure, comprising:

a light modulator having a plurality of light modulator elements of diffraction grating type, in each of said plurality of light modulator elements strip-like fixed reflection surfaces and strip-like moving reflection surfaces being alternately arranged;

a light source for emitting a light with which said light modulator is irradiated;

a holding part for holding a recording medium on which an image is recorded with signal beams from said light modulator;

a transfer mechanism for transferring said holding part relatively to said light modulator;

a detection circuit for detecting whether or not there is a transition of each of said plurality of light modulator elements from a state where the amount of sag of said moving reflection surfaces is large with respect to a change in driving voltage to a state where said amount is small; and a control circuit for temporarily supplying each of light modulator elements on which said transition is detected with an auxiliary driving voltage between a driving voltage on non-emission of a signal beam and a driving voltage on emission of a signal beam.

2. The image recording apparatus according to claim 1, wherein a driving voltage memory for storing data which corresponds to driving voltages in a state where the amount of sag is small for said plurality of light modulator elements; and an auxiliary driving voltage memory for storing data which corresponds to a relation between a plurality of values of driving voltages in a state where the amount of sag is small and a plurality of values of auxiliary driving voltages.

3. The image recording apparatus according to claim 1, further comprising:

an auxiliary driving voltage memory for storing auxiliary driving voltages for said plurality of light modulator elements, respectively.

4. The image recording apparatus according to claim 1, wherein said detection circuit comprises:

a first register for storing states at one point in time of said plurality of light modulator elements; and a second register for storing states at the next point in time of said plurality of light modulator elements, and said detection circuit detects said transition on the basis of said states at one point in time and said states at the next point in time.

5. The image recording apparatus according to claim 4, wherein a first driving voltage memory for storing data which corresponds to driving voltages in a state where the amount of sag is small for said plurality of light modulator elements;

a second driving voltage memory for storing data which corresponds to driving voltages in a state where the amount of sag is large for said plurality of light modulator elements; and an auxiliary driving voltage memory for storing data which corresponds to a relation between a plurality of values of driving voltages in a state where the amount of sag is small and a plurality of values of auxiliary driving voltages, said detection circuit includes part of a selector to which selection conditions are inputted from said first register and said second register, and said control circuit includes other part of said selector to which selection objects are inputted from said first driving voltage memory, said second driving voltage memory and said auxiliary driving voltage memory.

6. The image recording apparatus according to claim 4, wherein a first driving voltage memory for storing data which corresponds to driving voltages in a state where the amount of sag is small for said plurality of light modulator elements;

a second driving voltage memory for storing data which corresponds to driving voltages in a state where the amount of sag is large for said plurality of light modulator elements; and an auxiliary driving voltage memory for storing auxiliary driving voltages for each of said plurality of light modulator elements, respectively, said detection circuit includes part of a selector to which selection conditions are inputted from said first register and said second register, and said control circuit includes other part of said selector to which selection objects are inputted from said first driving voltage memory, said second driving voltage memory and said auxiliary driving voltage memory.

7. An image recording method of recording an image on a recording medium, wherein a light modulator has a plurality of light modulator elements of diffraction grating type, in each of said plurality of light modulator elements strip-like fixed reflection surfaces and strip-like moving reflection surfaces are alternately arranged, and said light modulator is irradiated with a light to record an image on said recording medium with signal beams from said light modulator, said image recording method comprising the steps of:

detecting whether or not there is a transition of each of said plurality of light modulator elements from a state where the amount of sag of said moving reflection surfaces is large with respect to a change in driving voltage to a state where said amount is small; and temporarily supplying each of light modulator elements on which said transition is detected with an auxiliary driving voltage between a driving voltage on non-emission of a signal beam and a driving voltage on emission of a signal beam.

* * * * *